`United States Patent Office`

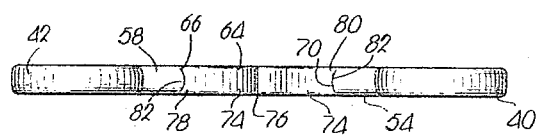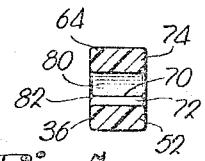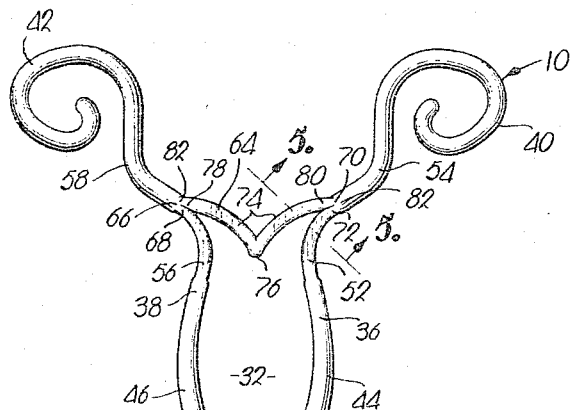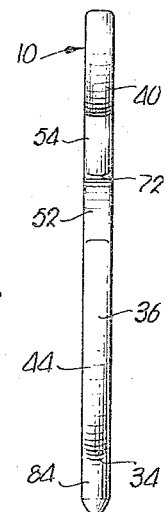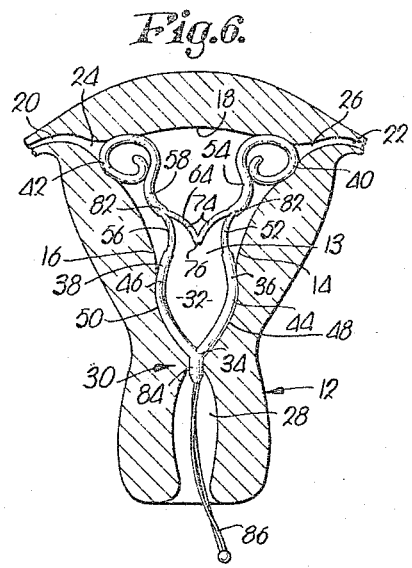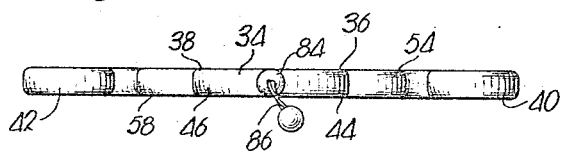

3,364,927
Patented Jan. 23, 1968

1

3,364,927
DEVICE FOR INTRAUTERINE USE
Ralph R. Robinson, 2024½ Cumberland Ave.,
Middlesboro, Ky. 40965
Continuation-in-part of application Ser. No. 489,693,
Sept. 23, 1965. This application Aug. 12, 1966, Ser.
No. 572,079
6 Claims. (Cl. 128—130)

This is a continuation-in-part of my copending application Ser. No. 489,693, filed September 23, 1965, now Patent No. 3,291,125 and entitled Pessary.

This invention relates to the field of intrauterine contraceptives, having as its primary object the provision of a device which cannot be expelled from the uterus by uterine contractions and which is free from irritation and discomfort factors.

It is one of the most important objects of the instant invention to provide a device for intrauterine use having substantial surface areas for uterus wall-engaging purposes strategically disposed for maximum effectiveness during contraction of the uterus in an effort to make sure that the expulsion of the device from the uterus during such contractions is fully impeded.

As a corollary to the foregoing object, the present invention provides a device having a pliable, yet resilient U-shaped loop extending transversely across the cervical mouth of the uterus and complementally engaging the walls of the latter to the end that, as uterine contractions occur, the loop will be flexed inwardly and present additional surface area for engagement by the uterine walls.

A very important object of the present invention is to provide a device in the nature of that disclosed in my Patent No. 3,234,938, issued February 15, 1966, and entitled "Intra-Uterine U Stem Pessary," with the addition in the instant invention of a properly formed resilient U-shaped loop cooperating with novel fallopian tube-engaging elements to provide additional zones of contact between the device and the uterus walls uniquely disposed to fulfill the aforesaid objects of comfort and non-expulsion.

An extremely important aim of my instant invention is the provision of structure presenting fulcrums for the arms of the U-shaped loop to act upon, whereby inward movement of the lower portions of the arms caused by a uterine contraction results in an outwardly directed urging of the fallopian tube-engaging elements into the fallopian tubes.

Yet another important aim of the invention is to provide a bridge interconnecting the arms of the U-shaped loop above the bight thereof to the end that the arms are yieldably maintained in spaced-apart relationship during uterine contractions for maximum uterine wall contact and each end of the element presents a fulcrum for a respective arm to act on while supporting the other end against lateral movement.

Another object of my present invention is the provision of a device wherein said bridge is V-shaped to permit collapsing of the device during insertion of the same through the cervix.

In the drawing:

FIGURE 1 is a front elevational view of a device for intrauterine use which embodies the principles of the present invention;

FIG. 2 is a side elevational view thereof;

FIG. 3 is a top plan view thereof;

FIG. 4 is a bottom plan view thereof;

FIG. 5 is an enlarged, cross-sectional, detail view taken along line 5—5 of FIG. 1; and FIG. 6 is a view similar to FIG. 1 on reduced scale

2 illustrating the device while being contracted within the uterus.

Device 10 is constructed of a resilient, yet pliable material such as plastic and is designed for insertion into the uterus 12 by tubular means as described in my above referenced patent. The uterine cavity 13 is defined by uterine walls 14, 16 and 18. Fallopian tubes 20 and 22 communicate with the cavity 13 and each tube 20 and 22 presents a mouth 24 and 26, respectively, at the zone of communication. The cervix 28 likewise comunicates with the cavity 13, and a uterus mouth 30 is presented therebetween.

Device 10 comprises a generally U-shaped loop 32 having a bight 34 for disposition across the cervix and a pair of arms 36 and 38 extending upwardly from the bight 34. Arm 36 has an upper head 40 thereon for disposition in mouth 26 of tube 22 and arm 38 has a similar upper head 42 thereon for dis position in mouth 24 of tube 20. A portion 44 of arm 36 and a similar portion 46 of arm 38 are bulged outwardly and disposed to extend upwardly from bight 34 for engagement with the uterus 12 at respective zones of engagement 48 and 50 on walls 14 and 16. As can be seen viewing FIG. 6, portions 44 and 46 are disposed for actuation inwardly by zones 48 and 50 of the uterous 12 during contraction of the uterine muscles.

Arm 36 has an inwardly bowed length 52 disposed between portion 44 and head 40, and an outwardly bowed stretch 54 disposed between length 52 and head 40. Similarly, arm 38 has an inwardly bowed length 56 disposed between portion 46 and head 42, and an outwardly bowed stretch 58 located between length 56 and head 42. Portion 44, length 52, stretch 54, and head 40 are configured to be substantially mirror images of the corresponding portion 46, length 56, stretch 58, and head 42 of arm 38, presenting a generally symmerical overall appearance. Each of the heads 40 and 42 respectively, complementally conform in size and configuration to a corresponding mouth 26 or 24.

An elongated bridge 64, generally V-shaped in configuration, extends between an area of interconnection 66 on the uppermost section 68 of length 56, and a corresponding area of interconnection 70 on the uppermost section 72 of length 52. Bridge 64 has a pair of legs 74 and a vertex 76 disposed between legs 74 and directed downwardly therefrom. Opposite ends 78 and 80 of bridge 64 are integral with corresponding uppermost sections 68 and 72 at areas of interconnection 66 and 70 and present fulcrums 82 whereby the heads 40 and 42 are pressed outwardly into engagement with the uterus 12 in mouths 24 and 26 as a muscular contraction acts inwardly on portions 44 and 46. Each leg 74 is disposed with respect to a corresponding length 52 or 56 to present an acute angle therebetween.

It is to be noted that bridge 64 is disposed to yieldably maintain arms 36 and 38 in spaced relationship during the inward actuation of portions 44 and 46 caused by a uterine contraction. Thus, portions 44 and 46 are maintained in contact with a corresponding uterine wall 14 or 16 along substantially the entire length of the portion as can be seen in FIG. 6. Bridge 64 and lengths 56 and 52 have a smaller transverse, cross-sectional area than the remainder of the device, permitting the latter to flex readily and be maintained in intimate contact with the walls 14, 16 and 18 of uterus 12.

Device 10 has centering means comprising a stem 84 integral with loop 32 and depending from bight 34; a tail 86 depends from stem 84. After device 10 is inserted into uterus 12, as illustrated in FIG. 6, stem 84 is disposed to extend through the mouth 30 of uterus 12 and into the cervix 28, while tail 86 extends through cervix 28 and out into the vagina (not shown). Viewing FIGS. 2, 3 and 4, it can be seen that the various components of device 10 are substantially coplanar. This configuration is preferred because the uterine cavity 13 is substantially laterally thin and flat, and if the components of device 10 were not substantially coplanar, irritation of the uterus could result.

FIG. 6 illustrates the disposition of device 10 after insertion into uterus 12. During uterine contraction, the uterus walls 14 and 16 move toward one another and portions 44 and 46 being flexible, will be pushed inwardly. This action has two results, firstly, additional surface area along portions 44 and 46 will come into engagement with walls 14 and 16, and secondly, fulcrums 82 will act on arms 36 and 38 to cause heads 40 and 42 to be urged laterally outwardly and into mouths 24 and 26. As uterine contractions increase in inensity, outwardly bowed stretches 54 and 58 will come into contact with walls 14 and 16 for additional resistance to expulsion. Thus, the possibilities of expelling device 10 are minimized during contraction of uterus 12.

Device 10 is designed to permit insertion thereof into cavity 13 by an insertion device as disclosed in my above referenced patent. In this respect, it is to be noted that the downwardly directed vertex 76, and the acute angle between legs 74 and lengths 52 and 56, permit device 10 to be collapsed into a substantially straight line configuration during insertion of the same through the cervix 28.

Irritation and discomfort factors have been reduced, if not eliminated, because device 10 grasps walls 14, 16 and 18 firmly during contraction, but relaxes at other times. Moreover, large areas of uterine wall contact are provided as distinguished from line, edge, or point contact found in prior art devices. Additionally, all surfaces are smooth, arcuate and uniform, avoiding sharp and angular irritation-producing areas, protuberances, corners or the like.

It is to be particularly noted that device 10 operates to cause heads 40 and 42 to be pushed into fallopian tube mouths 26 and 24 respectively during uterine contractions acting inwardly at zones of maximum muscular activity 48 and 50 on portions 44 and 46. This movement of heads 40 and 42 is caused by the strategic placement of bridge 64 and the fulcrum points 82 provided thereby. Device 10 is maintained firmly in place in uterus 12 by the placement of heads 40 and 42 within mouths 26 and 24. Manifestly, any tendency of the uterus 12 acting at mouths 26 and 24 to urge heads 40 and 42 toward one another is resisted, uterine walls 14 and 16 acting inwardly on portions 44 and 46 at zones 48 and 50. Thus, it can be seen that the device 10 becomes more firmly locked within uterus 12 as the intensity of muscular contractions increases. Furthermore, the novel construction of device 10 permits such firm locking to occur without causing the walls of the uterus to be irritated.

Having thus described the invention, what is claimed as new and desired to be secured by Letters Patent is:

1. A device for intrauterine use comprising:
   a generally U-shaped loop having a bight for disposition across the cervix and a pair of arms extending upwardly from the bight,
   each arm having a head for disposition in the mouth of a corresponding fallopian tube,
   there being an outwardly bulged portion in each arm respectively adjacent said bight disposed for engagement with the uterus and for actuation inwardly by the latter at the zones of engagement therebetween during contraction of the uterine muscles; and
   an elongated bridge of flexible material interconnecting said arms above said portions and yieldably maintaining the arms in spaced relationship during said muscular contraction,
   each end of said bridge presenting a fulcrum at the area of interconnection with a respective arm, whereby said heads are pressed outwardly into engagement with the uterus in said mouths and the portions are maintained against said zones as said muscular contractions continue to act inwardly on said portions, thereby impeding expulsion of the device from within the uterus, said bridge being generally V-shaped and having a pair of legs and a vertex whereby said device is collapsible to permit insertion through the cervix.

2. The invention of claim 1, said vertex being downwardly directed.

3. The invention of claim 2, each arm having an inwardly bowed length between its portion and its head, said area of interconnection being disposed on the uppermost section of the length, whereby said legs and said lengths present an acute angle therebetween.

4. The invention of claim 3, each arm having an outwardly bowed stretch between its length and its head disposed for movement against the uterus as the heads move into said mouths for further impediment of said device against expulsion from within the uterus.

5. The invention of claim 4, each head complementally conforming in size and in configuration to said mouths and serving, therefore, to further impede said device from expulsion when the heads are pressed into the mouths.

6. The invention of claim 3, said bridge and said lengths being smaller in transverse cross-sectional area than the remainder of said device.

References Cited

UNITED STATES PATENTS 3,234,938   2/1966   Robinson _____ 128—130
3,291,125  12/1966   Robinson _____ 128—130

ADELE M. EAGER, *Primary Examiner.*